United States Patent
Rustagi et al.

(10) Patent No.: US 11,525,683 B2
(45) Date of Patent: Dec. 13, 2022

(54) DRIFT-FREE VELOCITY ESTIMATION FOR MULTIROTOR SYSTEMS AND LOCALIZATION THEREOF

(71) Applicant: Tata Consultancy Services Limited, Mumbai (IN)

(72) Inventors: Vishvendra Rustagi, Kolkata (IN); Mohit Ludhiyani, Kolkata (IN); Arnab Sinha, Kolkata (IN); Ranjan Dasgupta, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 997 days.

(21) Appl. No.: 16/254,303

(22) Filed: Jan. 22, 2019

(65) Prior Publication Data

US 2020/0096341 A1  Mar. 26, 2020

(30) Foreign Application Priority Data

Sep. 21, 2018 (IN) .............................. 201821035683

(51) Int. Cl.
| | | |
|---|---|---|
| *G01C 21/18* | (2006.01) | |
| *G01C 21/16* | (2006.01) | |
| *B64C 27/08* | (2006.01) | |
| *B64C 39/02* | (2006.01) | |
| *G06F 17/16* | (2006.01) | |

(Continued)

(52) U.S. Cl.
CPC ............ *G01C 21/183* (2020.08); *B64C 27/08* (2013.01); *B64C 39/024* (2013.01); *G01P 15/14* (2013.01); *G05D 1/101* (2013.01); *G06F 17/16* (2013.01); *B64C 2201/024* (2013.01);

(Continued)

(58) Field of Classification Search
CPC ........ G01C 21/00; G01C 21/16; B64C 27/00; B64C 27/008; B64C 39/00; B64C 39/024; B64C 2201/108; G01P 15/00; G01P 15/14; G01P 15/16; G01P 15/165; G01P 15/18;

(Continued)

(56) References Cited

U.S. PATENT DOCUMENTS

| | | | |
|---|---|---|---|
| 7,526,402 B2 | 4/2009 | Tanenhaus et al. | |
| 9,174,733 B1 | 11/2015 | Burgess et al. | |
| 10,508,920 B2 * | 12/2019 | Bellusci | G01C 17/00 |

OTHER PUBLICATIONS

Meola, Daniala et al., "Flight Control System for small-size Unmanned Aerial Vehicles: Designa and Software-In-the-Loop Validation," pp. 357-362, 2013 Mediterranean Conference on Control & Automation (MED), Jun. 25-28, 2013. (Year: 2013).*

(Continued)

*Primary Examiner* — Son T Le
*Assistant Examiner* — Matthew W. Baca
(74) *Attorney, Agent, or Firm* — Finnegan, Henderson, Farabow, Garrett & Dunner LLP

(57) ABSTRACT

Embodiments of the present disclosure provide systems and methods to eliminate (or filter) drift for dynamics model based localization of multirotors. The dynamics equations require drag modelling, which is dependent on velocity, to generate vehicles' acceleration along the body axis. The present disclosure considers the drag contribution, at velocity level, as a low frequency component. Incorrect or non-modelling of this low frequency component leads to drift at velocity level. This drift can then be removed through a high pass filter to obtain drift free velocity data for pose estimation and better localization thereof.

6 Claims, 14 Drawing Sheets

(51) Int. Cl.
  *G05D 1/10* (2006.01)
  *G01P 15/14* (2013.01)
  *G06F 17/14* (2006.01)

(52) U.S. Cl.
  CPC .. *B64C 2201/108* (2013.01); *B64C 2201/127* (2013.01); *B64C 2201/141* (2013.01); *G06F 17/142* (2013.01)

(58) Field of Classification Search
  CPC .... G01P 7/00; G05D 1/00; G05D 1/10; G06F 17/16; G06F 17/142
  See application file for complete search history.

(56) References Cited

OTHER PUBLICATIONS

Cui, Jin Qiang et al., "Autonomous Navigation of UAV in Forest," 2014 International Conference on Unmanned Aircraft Systems (ICUAS), pp. 726-733, May 2014. (Year: 2014).*

M. J. Floor-Westerdijk, H. M. Schepers, P. H. Veltink, E. H. F. van Asseldonk and J. H. Buurke, "Use of Inertial Sensors for Ambulatory Assessment of Center-of-Mass Displacements During Walking," in IEEE Transactions on Biomedical Engineering, vol. 59, No. 7, pp. 2080-2084, Jul. 2012. (Year: 2012).*

Latt, W.T. et al. (2011). "Drift-Free Position Estimation of Periodic or Quasi-Periodic Motion Using Inertial Sensors," *Sensors*, vol. 11; pp. 5931-5951.

Zhi, R. "A Drift Eliminated Attitude & Position Estimation Algorithm in 3D," (2016). *Graduate College Dissertations and Theses.* Paper 450; 123 pages.

* cited by examiner

DRIFT-FREE VELOCITY ESTIMATION FOR MULTIROTOR SYSTEMS AND LOCALIZATION THEREOF

PRIORITY CLAIM

This U.S. application claims priority under 35 U.S.C. § 119 to: India Application No. 201821035683, filed on Sep. 21, 2018. The entire contents of the aforementioned application are incorporated herein by reference.

TECHNICAL FIELD

The disclosure herein generally relates to localization technique(s), and, more particularly, to drift-free velocity estimation for multirotor systems and localization thereof.

BACKGROUND

Global Positioning Systems (GPS) are used for localization of objects. However, these systems may be prone to errors and are likely to fail in indoor environment scenarios. Localization through GPS fails in case of indoor environments. Reliable Light Detection and Ranging (LIDAR) sensor is quite heavy to be mounted on a light-weight drone. Stereo-camera can provide a reliable metric-scale localization algorithm, but since the frequency of such localization output is limited by frame rate of the camera (usually 30 frames per second), it cannot be used reliably within Unmanned Aerial Vehicle (UAV) control system, which usually expects high localization frequency. Inertial measurement unit (IMU) provides sensor output, say at 200 Hz, but its localization accuracy drifts with time. Since then, attempts have been made on a monocular camera and an IMU for providing reliable high-frequency fused localization technique(s). The problem with such fusion algorithm/technique is that when the vision-based localization algorithm fails (due to lighting change, sudden rotation at UAV, or some other unforeseeable accounts), the drift in IMU-based localization severely impacts the overall solution.

SUMMARY

Embodiments of the present disclosure present technological improvements as solutions to one or more of the above-mentioned technical problems recognized by the inventors in conventional systems. For example, in one aspect, there is provided a processor implemented method for estimating drift-free velocity for multirotor systems and localization thereof. The method comprises receiving, via one or more hardware processors, gyroscope data pertaining to a multirotor system, wherein the gyroscope data comprises Euler angles indicative of orientation of the multirotor system; computing, via the one or more hardware processors, using Euler angles, acceleration data based on multirotor dynamics model; estimating, via the one or more hardware processors, velocity based on the acceleration data; determining, via the one or more hardware processors, frequency of drift caused due to inexact or non-modelling of drag force being identified as a low frequency component in the estimated velocity; and eliminating, using a band pass filter, the drift from the velocity by exploiting the low frequency component of the drag force, to obtain drift-free velocity data. In an embodiment, the band pass filter is a high band pass filter.

In an embodiment, the method may further comprise estimating, using the drift-free velocity data, a pose of the multirotor system and localization thereof.

In another aspect, there is provided a system for estimating drift-free velocity for multirotor systems and localization thereof. The system comprises a memory storing instructions; one or more communication interfaces; and one or more hardware processors coupled to the memory via the one or more communication interfaces, wherein the one or more hardware processors are configured by the instructions to: receive, gyroscope data pertaining to a multirotor system, wherein the gyroscope data comprises Euler angles indicative of orientation of the multirotor system; compute, using Euler angles, acceleration data based on multirotor dynamics model; estimate velocity based on the acceleration data; determine frequency of drift caused due to inexact or non-modelling of drag force being identified as a low frequency component in the estimated velocity; and eliminate (or filter), using a band pass filter, the drift from the velocity by exploiting the low frequency component of the drag force, to obtain drift-free velocity data. In an embodiment, the band pass filter is a high band pass filter.

In an embodiment, the one or more hardware processor are further configured by the instructions to estimate, using the drift-free velocity data, a pose of the multirotor system and localize thereof.

In yet another aspect, there are provided one or more non-transitory machine readable information storage mediums comprising one or more instructions which when executed by one or more hardware processors causes a method for estimating drift-free velocity for multirotor systems and localization thereof. The instructions further cause receiving, gyroscope data pertaining to a multirotor system, wherein the gyroscope data comprises Euler angles indicative of orientation of the multirotor system; computing, using Euler angles, acceleration data based on multirotor dynamics model; estimating velocity based on the acceleration data; determining frequency of drift caused due to inexact or non-modelling of drag force being identified as a low frequency component in the estimated velocity; and eliminating, using a band pass filter, the drift from the velocity by exploiting the low frequency component of the drag force, to obtain drift-free velocity data. In an embodiment, the band pass filter is a high band pass filter.

In an embodiment, the instructions may further cause estimating, using the drift-free velocity data, a pose of the multirotor system and localization thereof.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
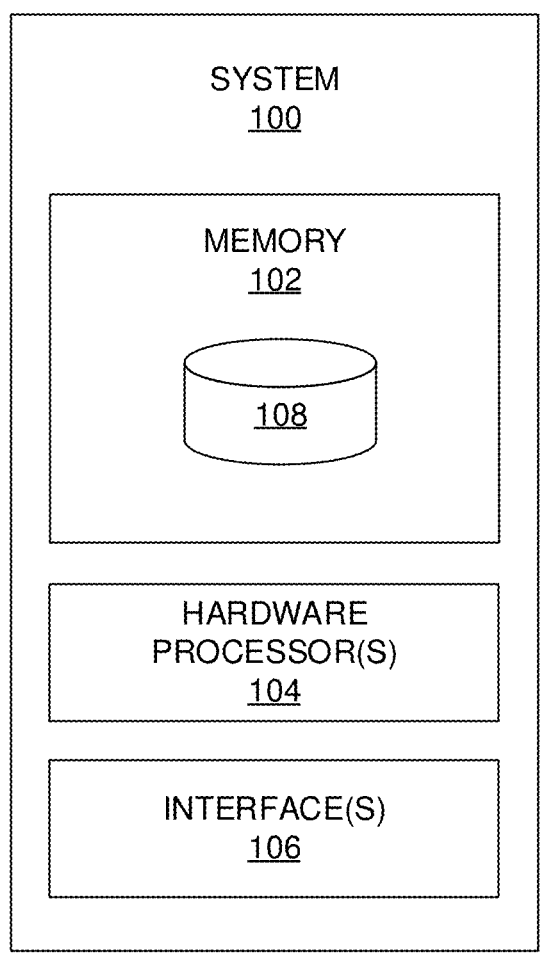
FIG. 1 illustrates an exemplary block diagram of a system for estimating drift free velocity for multirotor systems and localization thereof, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Multirotor system belongs to a particular class of aerial robotics which includes commonly known quadrotor, hexarotor, and octarotor. These platforms have gained popularity due to their small size and VTOL (vertical take-off and landing) capabilities. They have enormous application potential in areas such as surveying, disaster management, stock assessment, and the like.

Multirotors are under actuated systems i.e., only 4 out of 6 degrees of freedom can be independently controlled. These are inherently unstable and autonomous control of multirotor is preferred for most applications. However, autonomous control requires accurate and frequent estimation of the vehicle states such as position, velocity, and altitude. Such localization is obtained through either one or fusion of GPS, camera, LIDAR (Light detection and ranging), and IMU (Inertial measurement unit) based methods. However, multirotors are limited in their payload capacity and therefore limited by the number of sensors they can carry. This renders the state estimation problem challenging to solve.

As mentioned earlier, localization through GPS are prone to error(s) and are likely to fail in case of indoor and GPS denied environments. On the other hand, standard LIDAR sensor (capable of reliable 3D mapping) is quite heavy to be mounted on a light weight drone. Stereo camera can provide a scale aware localization algorithm but its sampling period is limited by frame rate of the camera (usually 20 to 30 FPS). Therefore it cannot be used reliably for multirotor control which usually expects ~100 Hz localization frequency.

While there are existing techniques that are being fused together (e.g., IMU and vision-based localization techniques) for a reliable high frequency fused localization algorithm, such fusion renders localization problems caused due to motion blur, drastic lighting change, sudden rotation at UAV, or some other unforeseeable accounts wherein the drift in IMU based localization severely impact the overall solution.

Embodiments of the present disclosure provide systems and methods for estimating drift free velocity for multirotor systems and localization thereof. More specifically, the present disclosure addresses problem of vehicle state estimation from IMU sensor by exploiting the model of multirotor dynamics. It is a fact that inexact or nonmodelling of drag causes drift in the motion. Therefore, instead of modelling the drag, the associated error due to its inexact or nonmodelling has been shown to behave as a low frequency component which is then filtered out, using a high pass filter, to remove its effect on the vehicle's velocity.

Referring now to the drawings, and more particularly to FIGS. 1 through 10, where similar reference characters denote corresponding features consistently throughout the figures, there are shown preferred embodiments and these embodiments are described in the context of the following exemplary system and/or method.

FIG. 1 illustrates an exemplary block diagram of a system 100 for estimating drift free velocity for multirotor systems and localization thereof, in accordance with an embodiment of the present disclosure. The system 100 may also be referred as 'a velocity estimation and localization system' and interchangeably used hereinafter. In an embodiment, the system 100 includes one or more processors 104, communication interface device(s) or input/output (I/O) interface(s) 106, and one or more data storage devices or memory 102 operatively coupled to the one or more processors 104. The one or more processors 104 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the device 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment a database 108 can be stored in the memory 102, wherein the database 108 may comprise, but are not limited to information on inputs for example gyroscope data comprising Euler angles, acceleration data, drag force contribution, velocity data, and the like. More specifically, information pertaining to absence and/or presence of drag force contribution as a low frequency component in the velocity, pose estimation and localization thereof. In an embodiment, the memory 102 may store one or more technique(s) (e.g., dynamic modeling technique(s) for example, multirotor dynamics model, filtering technique(s) for example high band pass filter, pose estimation technique(s), localization estimation, and the like) which when executed by the one or more hardware processors 104 to perform the methodology described herein. The memory 102 may further comprise information pertaining to input(s)/output(s) of each step performed by the systems and methods of the present disclosure.

Figure 2:
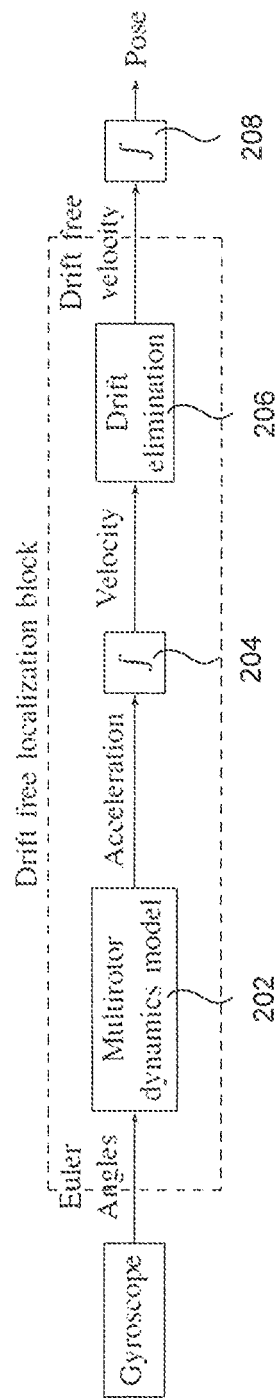
FIG. 2 illustrates an exemplary block diagram of the system of FIG. 1 for estimating drift free velocity for multirotor systems and localization thereof, in accordance with an embodiment of the present disclosure.

FIG. 2, with reference to FIG. 1, illustrates an exemplary block diagram of the system 100 of FIG. 1 for estimating drift free velocity for multirotor systems and localization thereof, in accordance with an embodiment of the present disclosure.

Figure 3:
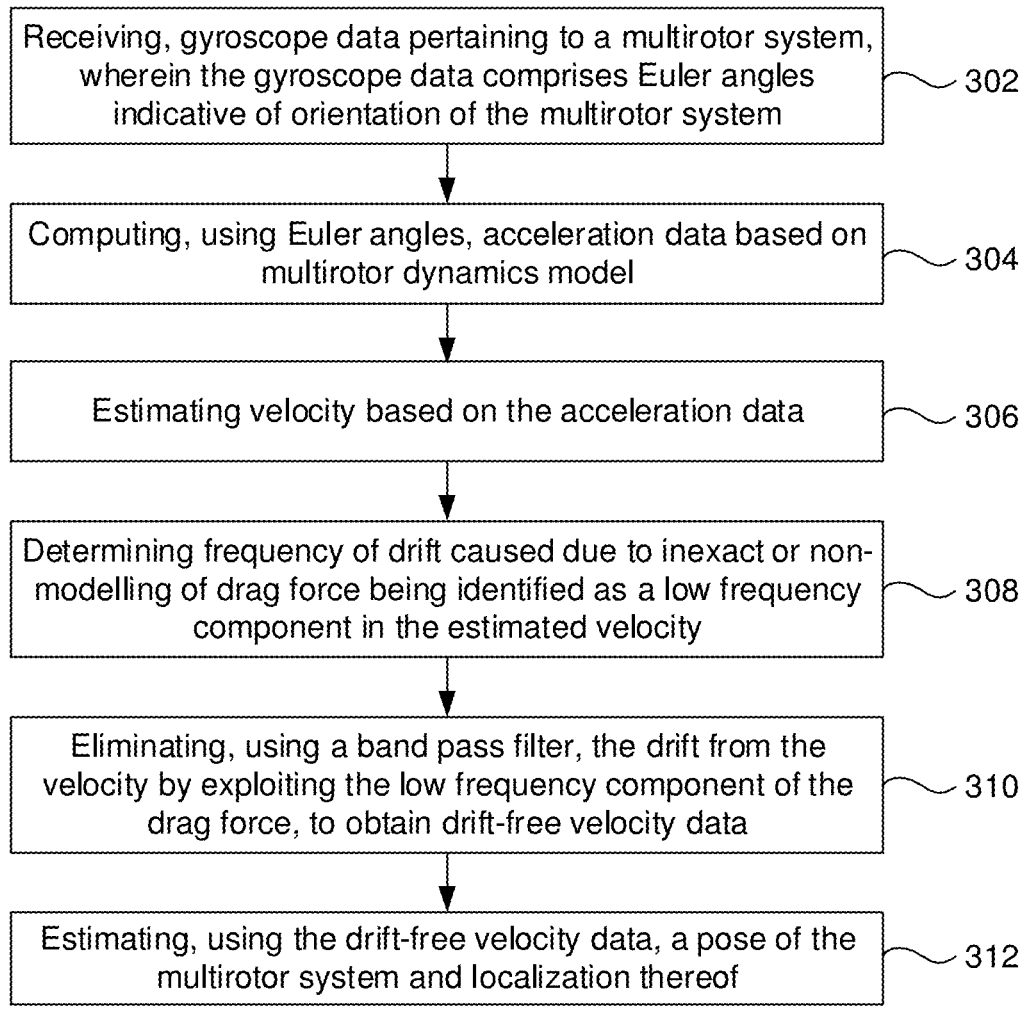
FIG. 3 illustrates an exemplary flow diagram of a method for estimating drift free velocity for multirotor systems and localization thereof using the system of FIG. 1 in accordance with an embodiment of the present disclosure.

FIG. 3, with reference to FIGS. 1-2, illustrates an exemplary flow diagram of a method for estimating drift free velocity for multirotor systems and localization thereof using the system 100 of FIG. 1 in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIGS. 1-2, and the flow diagram as depicted in FIG. 3.

In an embodiment of the present disclosure, at step 302, the one or more hardware processors 104 receive, gyroscope data pertaining to a multirotor system. The gyroscope data comprises Euler angles indicative of orientation of the multirotor system. In an embodiment of the present disclosure, at step 304, the one or more hardware processors 104 compute acceleration data using the Euler angles based on multirotor dynamics model (e.g., see Multirotor dynamics model block 202 of FIG. 2). In an embodiment of the present disclosure, at step 306, the one or more hardware processors 104 estimate velocity based on the acceleration data. In the present disclosure, integration (or integration operation/integral operation) is performed on the acceleration data to estimate velocity (e.g., see integration block 204 of FIG. 2). In an embodiment of the present disclosure, at step 308, the one or more hardware processors 104 determine frequency of drift caused due to inexact or non-modelling of drag force being identified as a low frequency component in the estimated velocity. Absence (or presence) of drag force contribution may be accounted for determining the frequency of drift in the estimated velocity and eliminating (or filtering) the drift thereof, in one example embodiment. In an embodiment of the present disclosure, at step 310, the one or more hardware processors 104 eliminate (or filter) the drift from the estimated velocity by exploiting (or by using) the low frequency component of the drag force, to obtain drift-free velocity data. In an embodiment, the drift is eliminated using a band pass filter (e.g., refer drift elimination block 206 of FIG. 2). More specifically, a high band pass filter is implemented by the system 100 to eliminate the drift from the velocity. In an embodiment of the present disclosure, at step 312, the one or more hardware processors 104 estimate, using the drift-free velocity data, a pose of the multirotor system and localization thereof. In an embodiment, integration operation is performed on the drift-free velocity data for estimating the pose of, and localizing the multirotor system thereof (e.g., refer integration block 208 of FIG. 2).

The above steps 302 till 312 are better understood by way of following description and examples:

In the following description equations follow conventional models (e.g., "R. Beard,—Quadrotor dynamics and control rev 0.1, 2008." and "D. Mellinger, Trajectory generation and control for quadrotors. University of Pennsylvania, 2012.") where drag force is assumed negligible compared to other forces namely gravity and thrust.

$$\begin{bmatrix} \dot{u} \\ \dot{v} \\ \dot{w} \end{bmatrix} = R_i^b \begin{bmatrix} 0 \\ 0 \\ g \end{bmatrix} + \frac{1}{M} \begin{bmatrix} 0 \\ 0 \\ T \end{bmatrix} + \begin{bmatrix} rv - qw \\ pw - ru \\ qu - pv \end{bmatrix} \quad (1)$$

Figure 4:
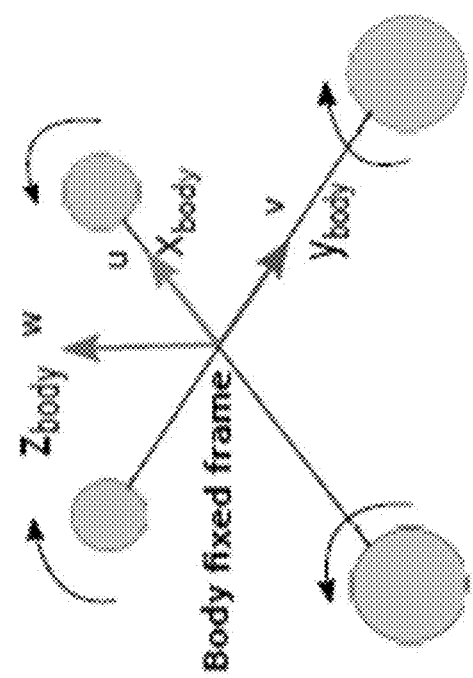
FIG. 4 depicts a multirotor axes system representation in accordance with an example embodiment of the present disclosure.
Figure 4:
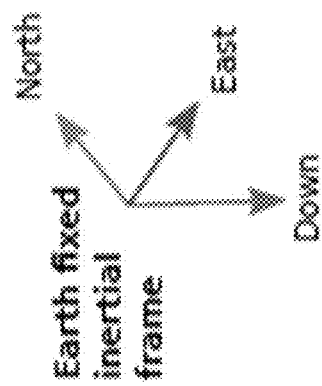

In the above equation (1), let u, v, w represent translational velocities along the body x-y-z axes as shown in FIG. 4. FIG. 4, with reference to FIGS. 1 through 3, depicts a multirotor axes system representation in accordance with an example embodiment of the present disclosure. p, q, r represent rotational velocities (or angular velocities wherein p is roll rate, q is pitch rate and r is yaw rate) around the body x-y-z axes and $R_i^b$ is the rotation matrix from inertial to body fixed frame. M and T represent the vehicle's mass and thrust force generated by the rotors respectively. The third term in the above equation (1) is due to the Coriolis force and is often considered negligible.

The above equation (1) can be integrated twice to give an estimate of vehicle's position given Euler angles ($\phi$, $\theta$, $\psi$), body frame velocity (u, v, w) and thrust, T, is known. $\phi$ denotes roll angle, $\theta$ denotes pitch angle, and $\psi$ denotes yaw angle which are given with respect to the vehicle 2-frame, the vehicle 1-frame, and the vehicle frame respectively. Though estimates of Euler angles and body frame velocities can be obtained through IMU and/or vision, the value of thrust is seldom known. However, the thrust term appears only in $\dot{w}$ and therefore any information on $\dot{w}$ cannot be provided unless thrust is known. Therefore, this method can only provide localization information along the x-y plane in the body fixed frame unless T is known. A possible solution would be to include $\dot{w}$ information from any other sensor into the model.

Although negligible drag assumption holds for the purpose of controlling the vehicle, it leads to drift in case of model based state estimation. The drag force can be represented by the rotor drag, modelled as directly proportional to vehicle's linear velocity along the body axes. Below equation (2) represents such a model.

$$\text{Drag} = \begin{bmatrix} \lambda_x & 0 & 0 \\ 0 & \lambda_y & 0 \\ 0 & 0 & \lambda_z \end{bmatrix} \begin{bmatrix} u \\ v \\ w \end{bmatrix} \quad (2)$$

Here $\lambda_x$, $\lambda_y$ and $\lambda_z$ are the drag constants along body fixed x-y-z axis respectively. Such modelling requires knowledge of proportionality constants for accurate drag estimation. These constants can be obtained from motion capture cameras through repeated experiments (e.g., these parameters can be estimated by considering them as state variables in an Extended Kalman Filter (EKF) framework). Considering that the drag can be exactly represented by linear velocity based model. In the present disclosure, an ideal case is assumed where the drag constants are exactly known and the body frame velocities are true. For such an ideal case (refer below equation (3) for ideal case), any drift is absent.

$$\begin{bmatrix} \dot{u} \\ \dot{v} \\ \dot{w} \end{bmatrix} = R_i^b \begin{bmatrix} 0 \\ 0 \\ g \end{bmatrix} + \frac{1}{M}\begin{bmatrix} 0 \\ 0 \\ T \end{bmatrix} + \begin{bmatrix} rv - qw \\ pw - ru \\ qu - pv \end{bmatrix} - \begin{bmatrix} \lambda_x & 0 & 0 \\ 0 & \lambda_y & 0 \\ 0 & 0 & \lambda_z \end{bmatrix}\begin{bmatrix} u \\ v \\ w \end{bmatrix} \quad (3)$$

Integrating equation (3) twice then leads to correct position estimate of the body relative to a fixed frame. This, in principle, solves the localization problem given all parameters are exactly known. However, due to nature of sensor (s), sensor readings are erroneous to a degree and the exact knowledge of model parameters is seldom known. Any deviation from their true values would deteriorate the acceleration estimate. This leads to drift in velocity estimate which further deteriorates the obtained acceleration.

$$\begin{bmatrix} u \\ v \\ w \end{bmatrix} = \int R_i^b \begin{bmatrix} 0 \\ 0 \\ g \end{bmatrix} dt + \int \frac{1}{M}\begin{bmatrix} 0 \\ 0 \\ T \end{bmatrix} dt \quad (4)$$

$$\begin{bmatrix} u \\ v \\ w \end{bmatrix} = \int R_i^b \begin{bmatrix} 0 \\ 0 \\ g \end{bmatrix} dt + \int \frac{1}{M}\begin{bmatrix} 0 \\ 0 \\ T \end{bmatrix} dt - \int \begin{bmatrix} \lambda_x & 0 & 0 \\ 0 & \lambda_y & 0 \\ 0 & 0 & \lambda_z \end{bmatrix}\begin{bmatrix} \int\int \dot{u} dt^2 \\ \int\int \dot{v} dt^2 \\ \int\int \dot{w} dt^2 \end{bmatrix} \quad (5)$$

Now a realistic but reduced model is considered in the present disclosure where drag is not modelled as in equation (1). After ignoring the Coriolis term, equation (1) and (3) are integrated as shown in the above equations (4) and (5) respectively. Equation (5) is then subtracted from equation (4) as shown in below equation (6). The difference in these equations is the drag term contribution and is the source of drift at velocity level, represented by $\Delta$ in equation (6). The drag (or also referred as drag force) contribution is discussed in step 308 of FIG. 3.

$$\Delta = -\begin{bmatrix} \lambda_x & 0 & 0 \\ 0 & \lambda_y & 0 \\ 0 & 0 & \lambda_z \end{bmatrix}\begin{bmatrix} \int\int \dot{u} dt^2 \\ \int\int \dot{v} dt^2 \\ \int\int \dot{w} dt^2 \end{bmatrix} \quad (6)$$

The integral operation behaves similar to a low pass filter for signals with high frequency compared to their cutoff frequency. In the present disclosure, the model based acceleration is treated as one such signal and consequently the drift term, $\Delta$, in equation (6) to be a low frequency signal. In other words, the inexact or non-modeling of the drag force is identified as a low frequency component. The same can be substantiated through FIG. 6A. A high pass filter is applied on the drag force identified as a low frequency component, thereby eliminating the menace of drift in velocity to obtain drift-free velocity data. The raw velocity signal obtained by integrating equation (1) is transformed to frequency domain through FFT (Fast Fourier transform) analysis to gain information on its cutoff frequency.

Figure 5A:
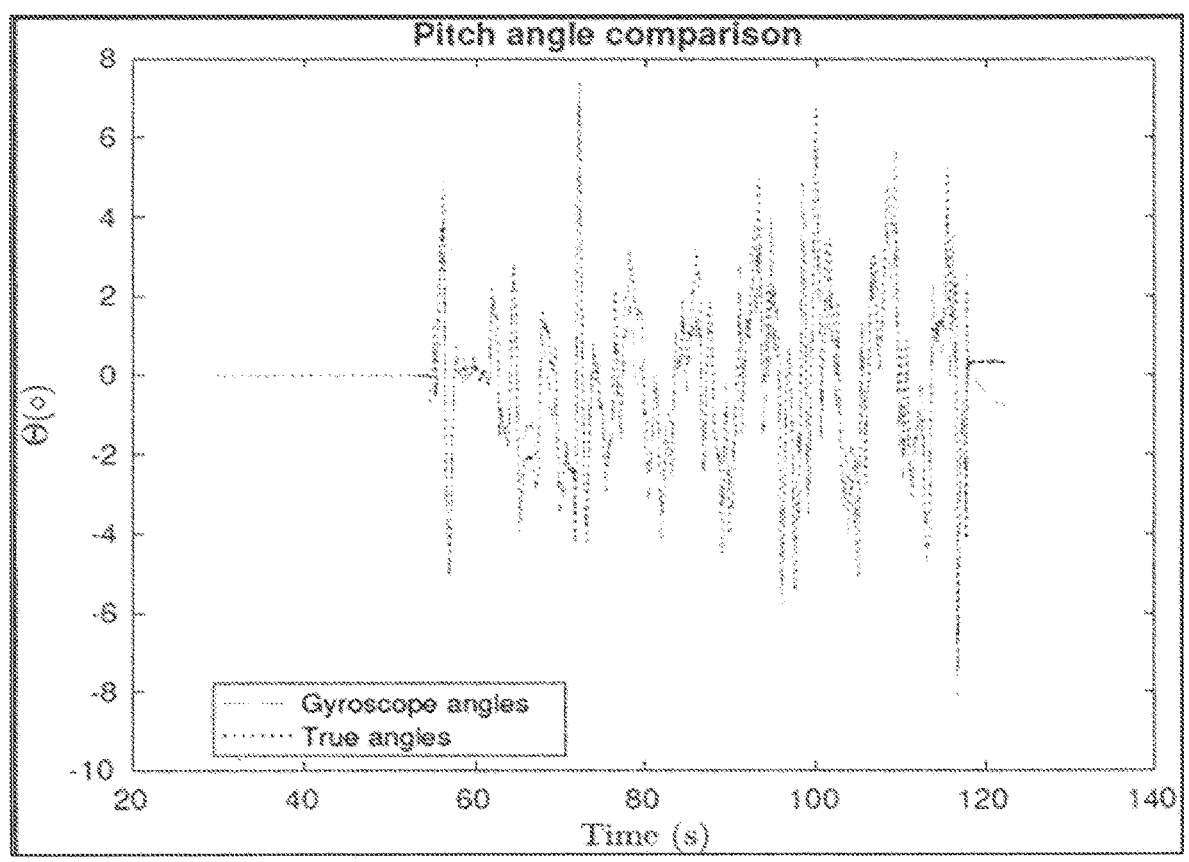
FIG. 5A depicts a graphical representation illustrating pitch angle comparison with respect to ground truth in accordance with an example embodiment of the present disclosure.
Figure 5B:
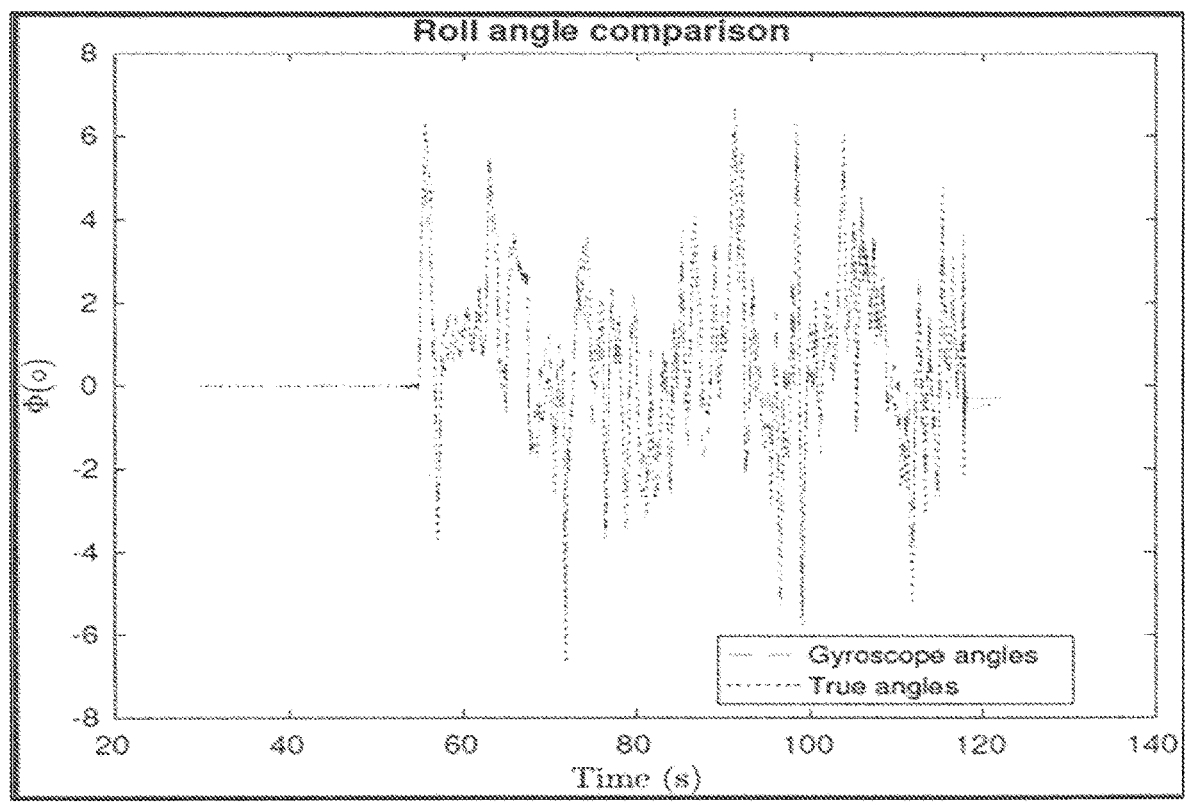
FIG. 5B depicts a graphical representation illustrating roll angle comparison with respect to ground truth in accordance with an example embodiment of the present disclosure.

Implementation:

In the present disclosure, the platform used for experimental validation was AR. Drone quadrotor vehicle. It has accelerometer and gyroscope along each of its axis. The drone's driver node publishes its present orientation relative to initial base-link frame in form of quaternion. This quaternion is used to find the drone's present yaw, pitch, and roll angle relative to initial base-link frame. The obtained angles have a constant but small bias of a few degrees. This bias is removed by recording these angles before take-off and subsequently removing them after take-off. FIGS. 5A-5B, with reference to FIGS. 1 through 4, depict graphical representations illustrating angle comparison with respect to ground truth in accordance with an example embodiment of the present disclosure. More specifically, FIG. 5A depicts a graphical representation illustrating pitch angle comparison with respect to ground truth in accordance with an example embodiment of the present disclosure. FIG. 5B depicts a graphical representation illustrating roll angle comparison with respect to ground truth in accordance with an example embodiment of the present disclosure. More particularly, FIGS. 5A-5B depict comparison of roll and pitch angles with their respective true values after bias removal. These angles are then used to compute the vehicle's acceleration, velocity, and position through the dynamics model. For sake of comparison and validation, it is also essential that the true values of these angles and the quadrotor pose are known. This is realised through an Optitrack system (e.g., Opti-Track. Optitrack for robotics. [Online]. Available: http://optitrack.com/motion-capture-robotics/), which consists of 8 motion capture cameras and provides pose data with millimeter level of accuracy. The exact position of vehicle is known through this system; true velocity and acceleration data are obtained by numerically differentiating the position data sequentially. The data from Optitrack and from AR. Drone arrive at different frequencies and are synchronized for the purpose of comparison. Timestamps of different data stream are synchronized through ROS message filter. ROS message filter refer to a set of message filters which take in messages and may output those messages at a later time, based on the conditions that filter needs met. In an embodiment, messages comprise pose data consisting of position and orientation of the body which are taken as input at a fixed frequency and output messages are the same messages but their frequency is changed such that they are synchronous with the similar messages obtained from Optitrack system.

Figure 6A:
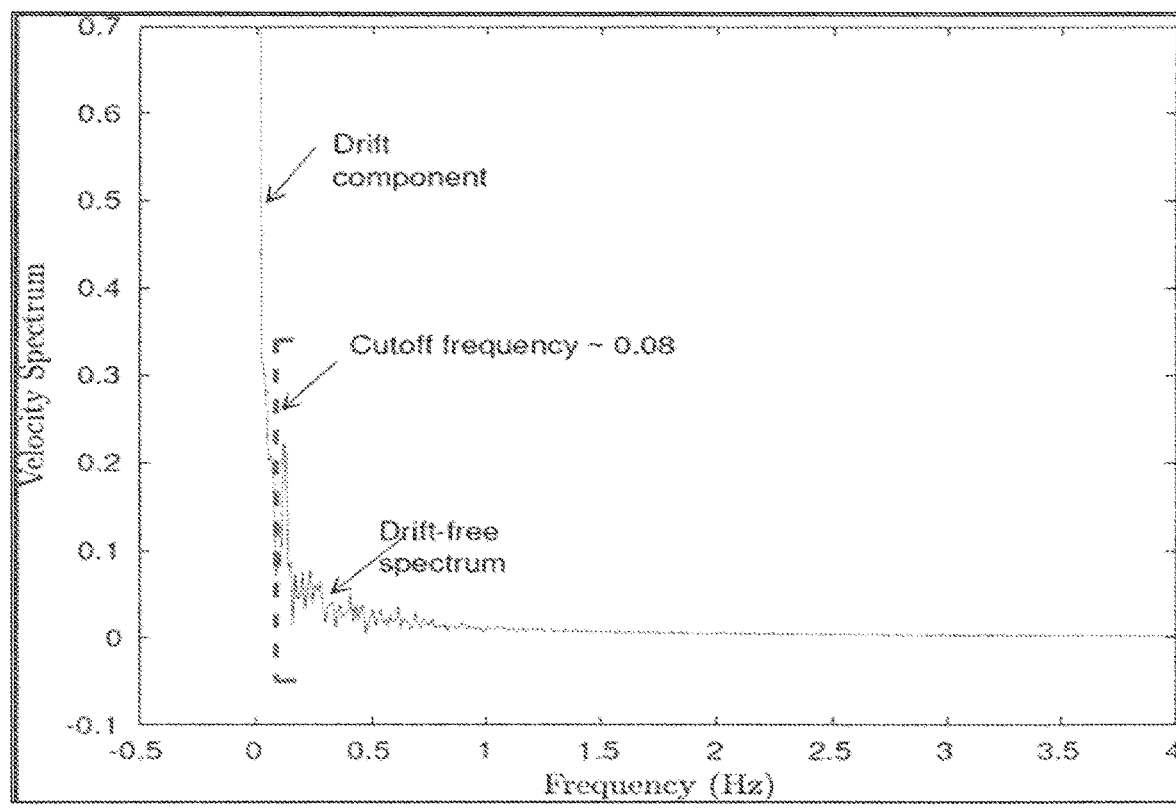
FIG. 6A depicts a graphical representation illustrating frequency domain plot of model based velocity in accordance with an example embodiment of the present disclosure.
Figure 6B:
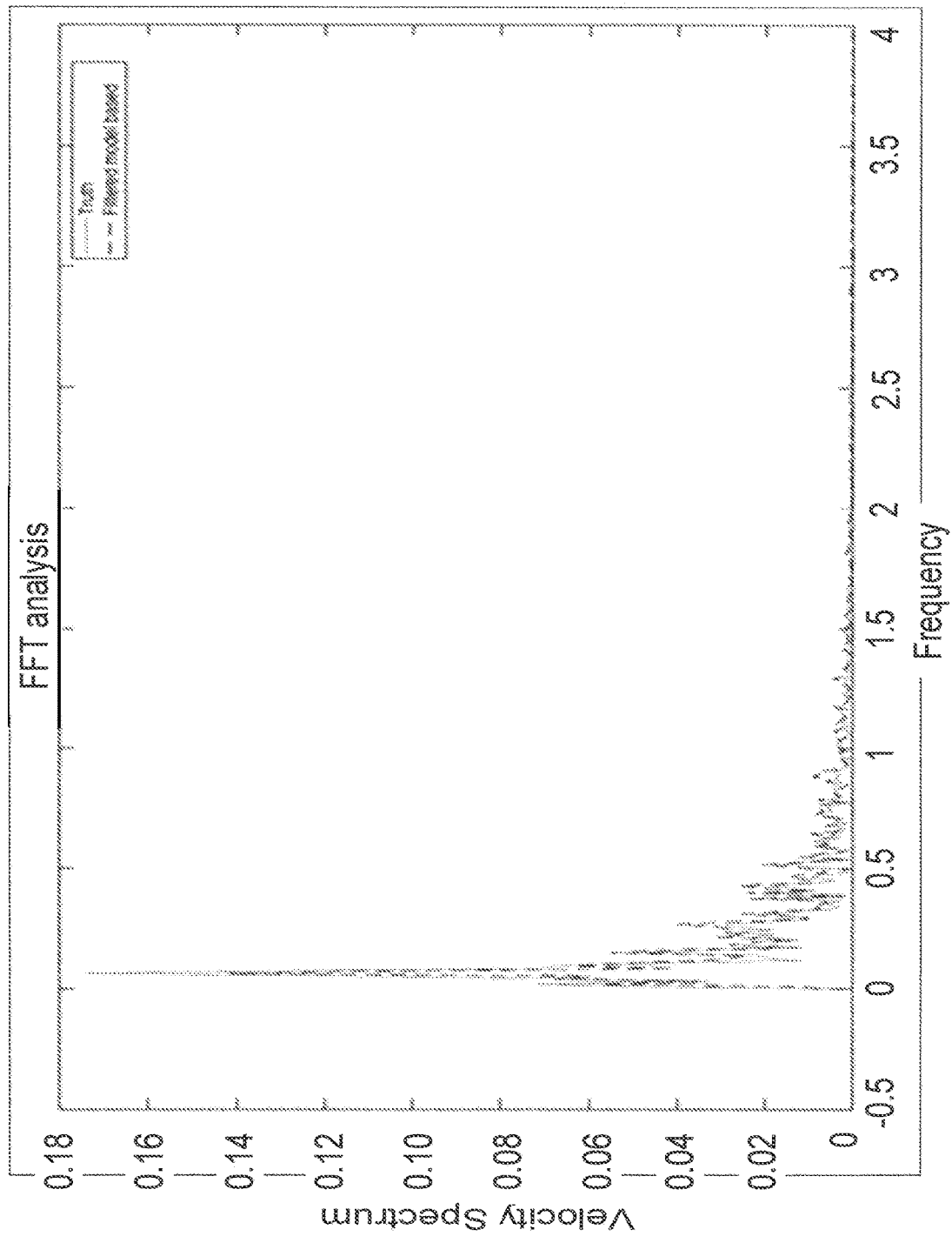
FIG. 6B depicts a graphical representation illustrating a comparison of filtered model based velocity with the true value in frequency domain in accordance with an example embodiment of the present disclosure.

Henceforth, the achieved data frequency shall be referred to as the synchronous frequency. The AR. Drone quadrotor moves autonomously in a lemniscate trajectory, resembling numeral eight, through a MATLABROS bridge. The vehicle's attitude is also recorded through the messages sent by the AR. Drone driver node. The obtained Euler angles are then used to generate vehicle's acceleration (e.g., see step 304 of FIG. 3), velocity through the dynamics model in real time (e.g., see step 306 of FIG. 3). Further, a high pass filter is applied on the real time velocity to remove the drift term as described in equation (6) (e.g., see step 310 of FIG. 3). The filter cut off frequency is obtained by performing an FFT analysis on the model based velocity, shown in FIG. 6A. More specifically, FIG. 6A, with reference to FIGS. 1 through 5B, depicts a graphical representation illustrating frequency domain plot of model based velocity in accordance with an example embodiment of the present disclosure. As can be seen from FIG. 6A, demarcation is done at the cut off frequency separates drift, left of demarcation, from meaningful velocity information based on frequency. This process is done off line but once done, it remains robust for different trajectories. This nature can be attributed to low relative magnitude of drag. FIG. 6B, with reference to FIGS. 1 through 6A, depicts a graphical representation illustrating a comparison of filtered model based velocity with the true value in frequency domain in accordance with an example embodiment of the present disclosure. The drift component visible in FIG. 6A is now filtered out. Finally, the drift free filtered velocity is then used to regenerate the vehicle's pose (e.g., see step 312 of FIG. 3).

Results

Figure 7A:
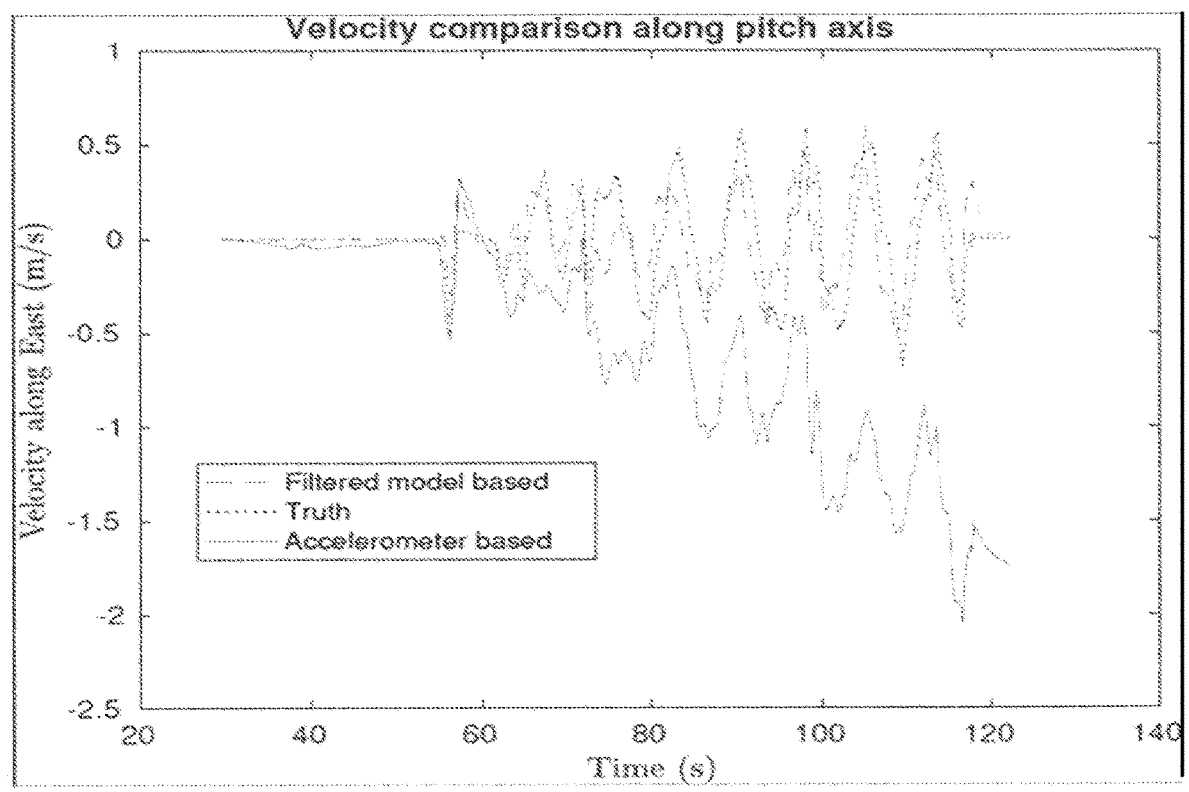
FIGS. 7A-7B depict a graphical representation illustrating a comparison of model based filtered velocities, along East and North directions respectively, with their respective ground truth values, and with accelerometer based velocities in accordance with an example embodiment of the present disclosure.
Figure 7B:
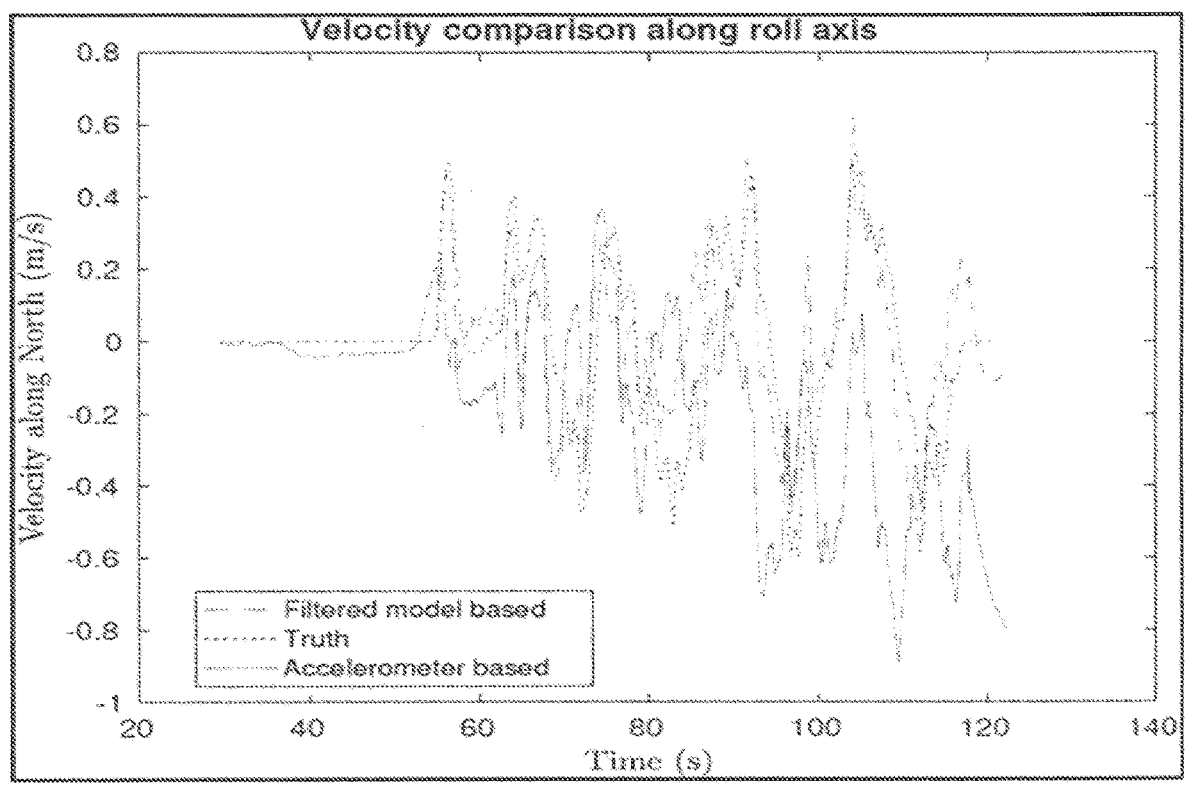
Figure 8A:
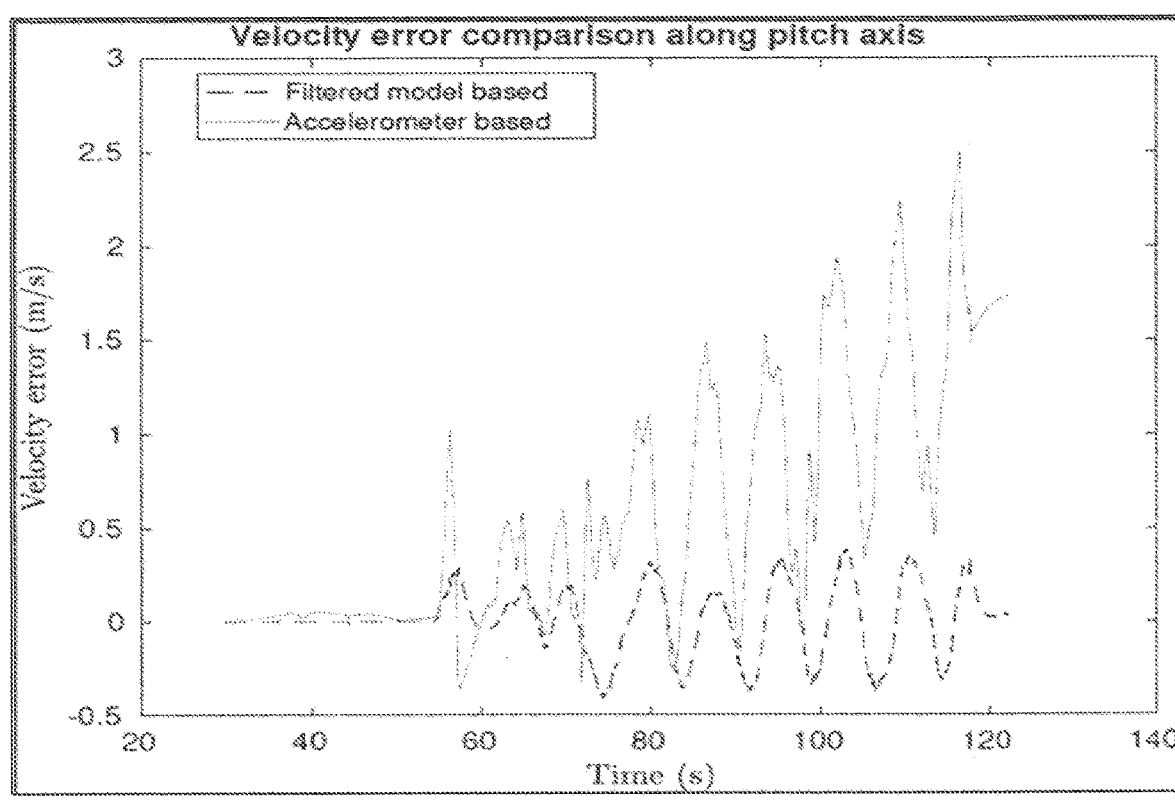
FIGS. 8A-8B depict graphical representations illustrating velocity error along East and North directions respectively in accordance with an example embodiment of the present disclosure.
Figure 8B:
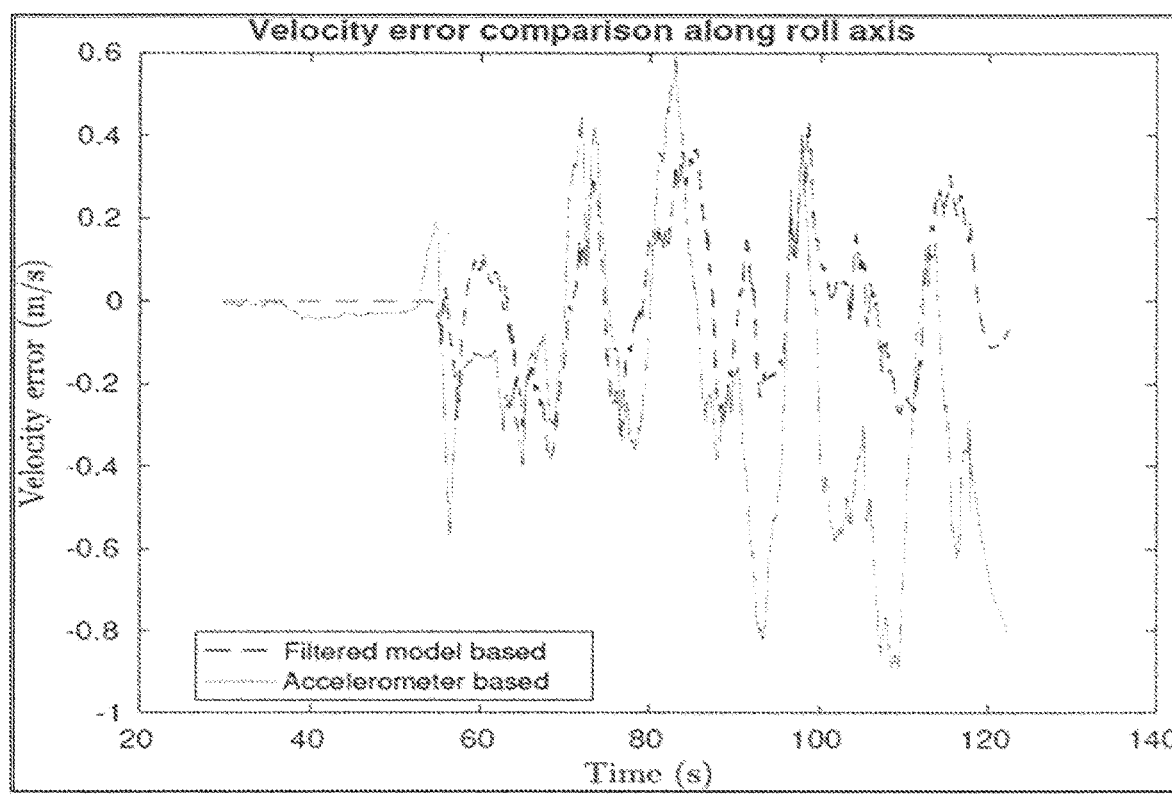

Model Based Drift Free Velocity Estimation:

Here in the results section, the filtered model based state estimation (acceleration, velocity, and position) is compared with their respective true values for a lemniscate trajectory. FIGS. 7A-7B, with reference to FIGS. 1 through 6B, depict a graphical representation illustrating a comparison of model based filtered velocities, along East and North directions respectively, with their respective ground truth values, and with accelerometer based velocities in accordance with an example embodiment of the present disclosure. The cutoff frequency is ≈0.1% of the synchronous frequency of 66 Hertz. It is apparent that the model based filtered velocity lacks any drift whereas the same is present in accelerometer based velocity even after bias removal through Optitrack. It can be seen from FIGS. 7A-7B that the model based filtered velocity closely matches the true values. FIGS. 8A-8B, with reference to FIGS. 1 through 7B, depict graphical representations illustrating velocity error along East and North directions respectively in accordance with an example embodiment of the present disclosure. More particularly, in graphical representations of FIGS. 8A-8B, it is shown that the error in model based filtered velocity is relatively low and does not increase with time as opposed to accelerometer based results. However, while removing the low frequency drift, some meaningful low frequency component is also lost which leads to signal attenuation at places. Although the velocity estimates still remain reasonably good, the pose estimate may have an impact. Nonetheless, the present disclosure and its systems and methods would be of significant advantage when used in conjunction with vision based methods.

Figure 9:
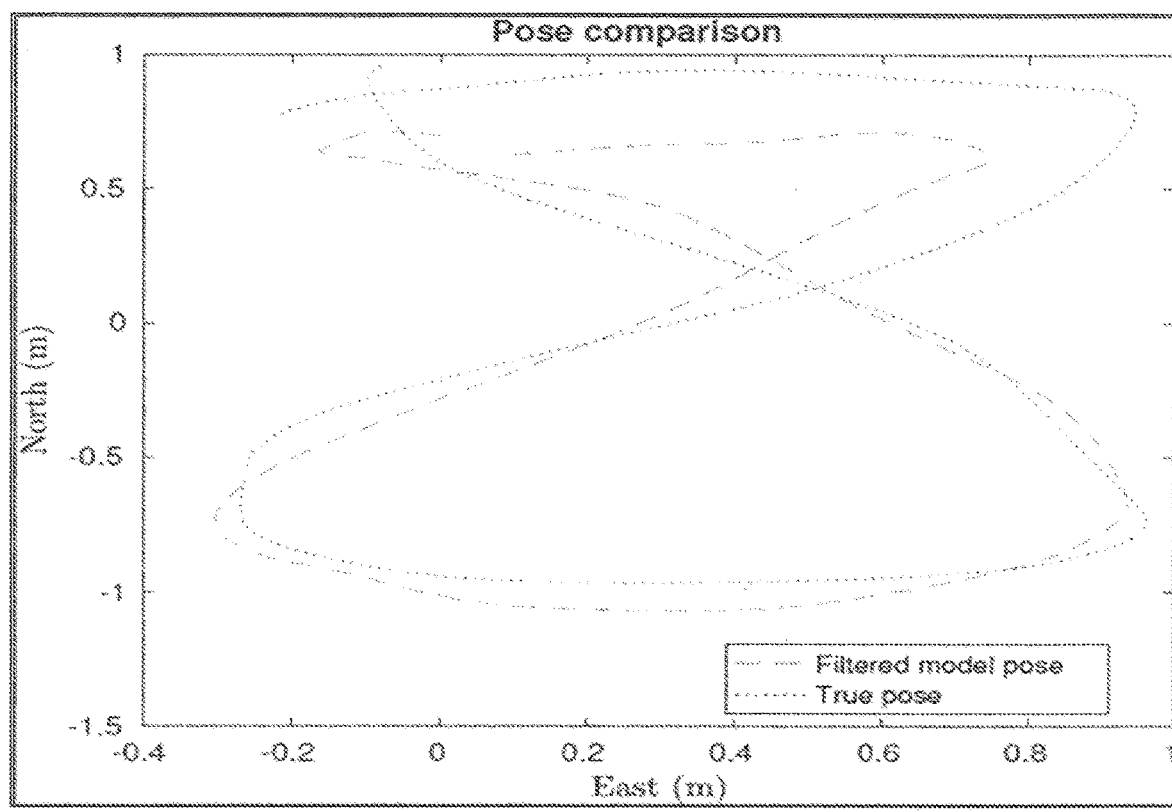
FIG. 9 depicts a graphical representation illustrating model based estimate of a lemniscate shaped trajectory along with the true pose in accordance with an example embodiment of the present disclosure.
Figure 10:
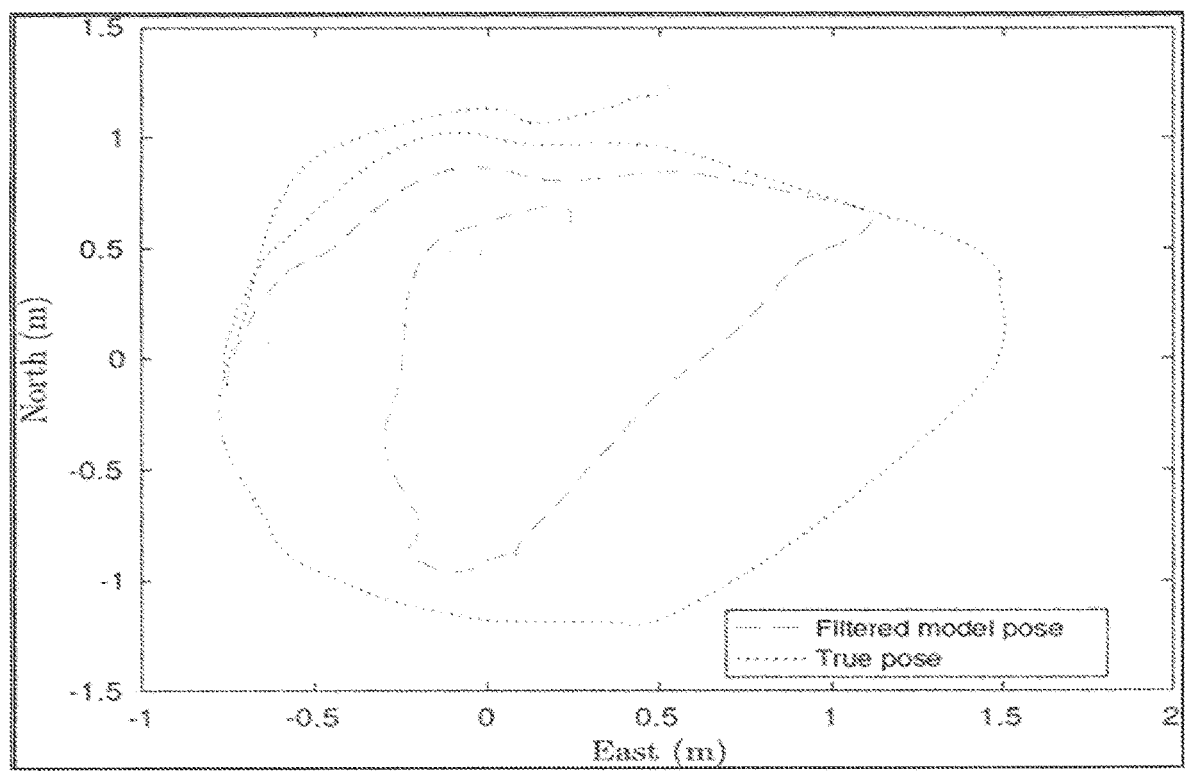
FIG. 10 depicts a graphical representation illustrating pose estimate of a circular trajectory in accordance with an example embodiment of the present disclosure.

Further, FIG. 9, with reference to FIGS. 1 through 8, depicts a graphical representation illustrating model based estimate of a lemniscate shaped trajectory along with the true pose in accordance with an example embodiment of the present disclosure. In other words, in FIG. 9, the obtained pose is initialized with the truth value. The proposed approach is further validated through a circular trajectory, of radius 1m, to demonstrate its robustness (not shown in FIGS). In addition, estimated pose is also shown with the true pose in FIG. 10. More specifically, FIG. 10, with reference to FIGS. 1 through 9, depicts a graphical representation illustrating pose estimate of a circular trajectory in accordance with an example embodiment of the present disclosure.

Embodiments of the present disclosure provide systems and methods for model based localization for multirotor system treating drag contribution as a low frequency component. Results depict that this method produces drift free velocity which does not happen in case of velocity estimate using accelerometer or when drag modelling is not exact in the multirotor's equations of motion. Conventional techniques for example, Vision-IMU fusion suffers from drift during track loss which causes divergence in state estimation. The method of the present disclosure localizes the vehicle until the loss of track or features is recovered.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
   receiving, via one or more hardware processors, gyroscope data pertaining to a multirotor system (302), wherein the gyroscope data comprises Euler angles indicative of orientation of the multirotor system; computing via the one or more hardware processors, using Euler angles, acceleration data based on a multirotor dynamics model (304);
   estimating, via the one or more hardware processors, velocity based on the acceleration data (306) to obtain velocity data;
   determining, via the one or more hardware processors, frequency of drift caused due to inexact or non-modelling of drag force in the estimated velocity by transforming the velocity data to a frequency domain through a Fast Fourier Transform (FFT) to obtain a cut off frequency that separates a drift from the velocity in the frequency domain, wherein the cut off frequency is obtained from a frequency of a received data stream synchronized in time through a ROS (Robot Operating System) message filter with messages including pose data consisting of a position and the orientation of the multirotor system taken as input at a fixed frequency, wherein the frequency of output messages from the ROS message filter is changed to a synchronous frequency that is synchronous with similar messages obtained from a system, wherein the cut off frequency is 0.1% of the synchronous frequency, and wherein the drag force is identified as a low frequency component (308); and
   eliminating, using a band pass filter, the drift from the velocity by applying the band pass filter on the drag force identified as the low frequency component, to obtain drift-free velocity data (310).

2. The processor implemented method of claim 1, further comprising regenerating, using the drift-free velocity data, a pose of the multirotor system and localization thereof (312).

3. A system (100), comprising:
   a memory (102) storing instructions;
   one or more communication interfaces (106); and
   one or more hardware processors (104) coupled to the memory (102) via the one or more communication interfaces (106), wherein the one or more hardware processors (104) are configured by the instructions to:
   receive, gyroscope data pertaining to a multirotor system, wherein the gyroscope data comprises Euler angles indicative of orientation of the multirotor system;
   compute, using Euler angles, acceleration data based on a multirotor dynamics model;
   estimate velocity based on the acceleration data to obtain velocity data;
   determine frequency of drift caused due to inexact or non-modelling of drag force in the estimated velocity by transforming the velocity data to a frequency domain through a Fast Fourier Transform (FFT) to obtain a cut off frequency that separates a drift from the velocity in the frequency domain, wherein the cut off frequency is obtained from a frequency of a received data stream synchronized in time through a ROS (Robot Operating System) message filter with messages including pose data consisting of a position and the orientation of the multirotor system taken as input at a fixed frequency, wherein the frequency of output messages from the ROS message filter is changed to a synchronous frequency that is synchronous with similar messages obtained from a system, wherein the cut off frequency is 0.1% of the synchronous frequency, and wherein the drag force is identified as a low frequency component; and
   eliminate, using a band pass filter, the drift from the velocity by applying the band pass filter on the drag force identified as the low frequency component, to obtain drift-free velocity data.

4. The system of claim 3, wherein the one or more hardware processors are further configured to regenerate, using the drift-free velocity data, a pose of the multirotor system and localize thereof.

5. One or more non-transitory machine readable information storage mediums comprising one or more instructions which when executed by one or more hardware processors cause:
   receiving, via the one or more hardware processors, gyroscope data pertaining to a multirotor system, wherein the gyroscope data comprises Euler angles indicative of orientation of the multirotor system;
   computing via the one or more hardware processors, using Euler angles, acceleration data based on a multirotor dynamics model;

estimating, via the one or more hardware processors, velocity based on the acceleration data to obtain velocity data;

determining, via the one or more hardware processors, frequency of drift caused due to inexact or non-modelling of drag force in the estimated velocity by transforming the velocity data to a frequency domain through a Fast Fourier Transform (FFT) to obtain a cut off frequency that separates a drift from the velocity in the frequency domain, wherein the cut off frequency is obtained from a frequency of a received data stream synchronized in time through a ROS (Robot Operating System) message filter with messages including pose data consisting of a position and the orientation of the multirotor system taken as input at a fixed frequency, wherein the frequency of output messages from the ROS message filter is changed to a synchronous frequency that is synchronous with similar messages obtained from a system, wherein the cut off frequency is 0.1% of the synchronous frequency, and wherein the drag force is identified as a low frequency component; and eliminating, using a band pass filter, the drift from the velocity by applying the band pass filter on the drag force identified as the low frequency component, to obtain drift-free velocity data.

6. The one or more non-transitory machine readable information storage mediums of claim 5, wherein the instructions further cause: regenerating, using the drift-free velocity data, a pose of the multirotor system and localization thereof.

* * * * *